Dec. 25, 1962 T. H. STEARNS 3,070,650

SOLDER CONNECTION FOR ELECTRICAL CIRCUITS

Filed Sept. 23, 1960

Thomas H. Stearns
INVENTOR

Robert O. Richardson
ATTORNEY

United States Patent Office 3,070,650
Patented Dec. 25, 1962

3,070,650
SOLDER CONNECTION FOR ELECTRICAL CIRCUITS

Thomas H. Stearns, Wilton, N.H., assignor to Sanders Associates, Inc., Nashua, N.H., a corporation of Delaware Filed Sept. 23, 1960, Ser. No. 57,936
4 Claims. (Cl. 174—88)

This invention relates to a method and article for connecting circuits and more particularly to a method and article for connecting multilayers of flexible circuit conductors each encapsulated between layers of thermoplastic material.

In making connections to a flexible circuit encapsulated in a thermoplastic material, a portion of the top cover must be removed to expose the conductor for soldering. Additional problems are presented, however, when multilayers of such circuits are to be connected in a plurality of connections and the circuit strips are to be bonded together at the point of overlap. In bonding the two strips of thermoplastic material under suitable heat and pressure, the solder used in soldering connections between the conductors tends to flow laterally around the conductors and wet adjacent conductors due to the laminating pressures. The upper cover of the adjacent conductor is easily penetrated by the hot solder and therefore does not insulate the adjacent conductor from its flow. This results in shorts and interconnections between conductors that are not desired.

The above problems have been solved according to the present invention by the provision of a support between the strips to withstand the laminating pressures whereby the solder is not forced to flow laterally between the conductors and as a result the solder wets only the surfaces between which connection is desired.

This support is preferably of a porous material impregnated with solder which will flow at the laminating temperature. It is therefore an object of the present invention to provide for a new and improved method and article for connecting circuits.

A further object is the provision of a method and article for connecting circuits wherein the solder used in electrically bonding the conductors will not flow laterally under vertical pressure when the encapsulating thermoplastic material is being bonded together.

Another object is the provision of the method and article for splicing other circuitry to a circuit already encapsulated in thermoplastic material.

These and other objects will become more apparent as a description of the invention proceeds with reference to the drawings wherein.

Figure 1:
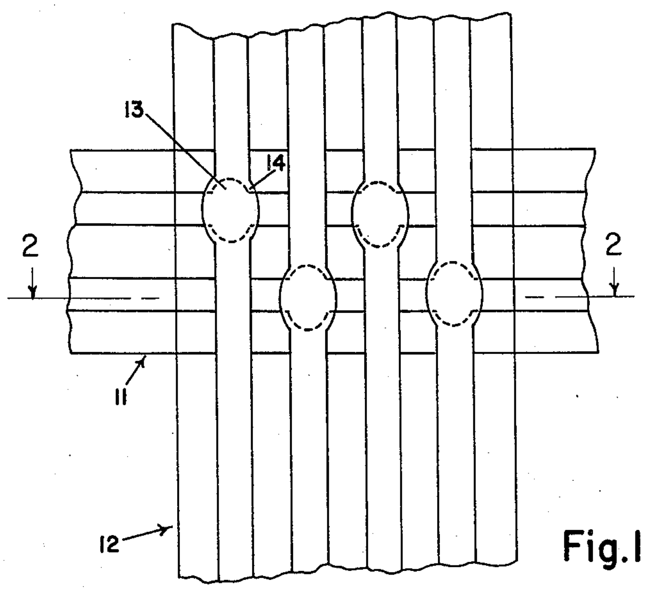
FIGURE 1 shows a plan view of two conductive strips bonded at right angles.

Referring now to FIGURE 1, there is shown a first circuit strip 11, and a second circuit strip 12 shown crossing thereover. These circuits are preferably laminated in a manner taught in co-pending application Serial No. 21,272, filed April 11, 1960, now Patent No. 2,997,521, although other methods are equally acceptable for purposes of this invention. At points where the conductive paths in strips 11 and 12 are to be connected, the paths are enlarged at these points if the conductor strips themselves are so small as to make enlargement desirable. These enlargements 13 and 14 match when the strips are positioned in the desired manner. The upper surface of enlarged portion 13 and the under surface of enlarged portion 14 are bared and free from the thermoplastic material in which the circuit paths are encapsulated. Improved methods for doing this are disclosed in co-pending application Serial No. 60,638. Since it is preferable to use a thermoplastic material popularly known as Kel–F, a trademark of the Minnesota Mining and Manufacturing Company, more fully described in co-pending application Serial No. 21,272, now Patent No. 2,997,521, the temperature required in bonding strips 11 and 12 together is high enough that the solder used will also flow and bond the conductors together at points 13, 14. However, under the laminating pressures used the solder between these points will flow laterally and short out or connect other conductors.

Figure 2:
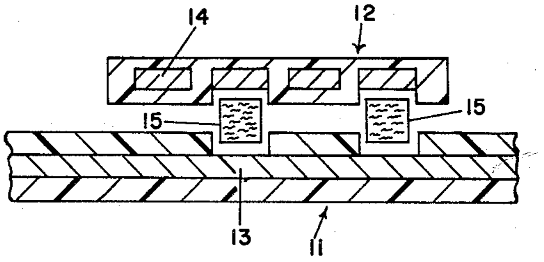
FIGURE 2 is a cross sectional elevation taken along the line 2—2 in FIGURE 1.

As shown in FIGURE 2, a solder-filled connector 15 interconnects these conductors. The connector itself is preferably a sintered bronze pad of appropriate thickness to make the interconnection between the conductors under the bonding pressure and temperature. As heat is applied the solder in the bronze pad melts and flows along the walls of the pad due to a capillary action and both mechanically and electrically connects the contact portions 13 and 14.

Other types of solder pads may be used. For example, a thin-walled honeycombed material may be filled with solder with the honeycomb walls providing the resistive forces against the laminating pressure and containing the solder therein to prevent its lateral flow. In another embodiment a porous material having a structural strength is used with a thin sheet of solder material attached thereto to form a composite layer. Upon melting the solder flows through the porous material to contact the conductors on opposite sides of the material. A characteristic of these connectors is that they maintain structural strength to space the conductors during lamination and permit solder contact of the conductors during lamination.

These and other modifications will readily occur to one skilled in the art in view of the present invention. It is to be understood, therefore, that the foregoing description is by way of illustration and example only, and that the spirit and scope of this invention is to be limited only by the terms of the appended claims.

What is claimed is:

1. In combination, a pair of conductive paths, a structural member mounted between said paths to maintain them in fixed spaced relation, said paths having insulation on them except at point of contact with said structural member, said insulation being bondable at a predetermined pressure and temperature, said structural member having a melting point higher than said temperature, said structural member containing a fusible material of a melting point at least as low as said temperature, said fusible material electrically and mechanically bonding said conductors together.

2. In combination, a pair of conductive paths, said paths having insulation thereon, said insulation being bondable to each other at a predetermined pressure and temperature, said paths being positioned adjacent each other, a structural member having a melting point higher than said temperature, said structural member containing a fusible material of a melting point at least as low as said temperature, said structural member containing said fusible material being positioned between bared uninsulated portions of said paths and connected therewith, said fusible material electrically and mechanically bonding said conductor paths together upon application of heat and pressure which bonds said insulation.

3. In combination, a pair of conductive paths electrically and mechanically bonded together through a structural member mounted therebetween to maintain them in fixed spaced relation and in electrical contact, said paths having insulation on them except at point of contact with said structural member, said insulation being bondable to each other at a predetermined pressure and temperature, said structural member having a melting point higher than said temperature, said structural member containing a fusible material of a melting point at least as low as said temperature, said fusible material electrically and mechanically bonding said conductor paths together, said structual member preventing lateral flow of said fusible material when said laminating pressure is applied.

4. In combination, a pair of strips having a plurality of conductive paths therein electrically bonded together at predetermined points, a structural member mounted between overlapping paths at said points to maintain said paths in fixed spaced relation, said paths having insulation on them except at said points where said paths are in contact with said structural member, insulation on said paths adjacent to said points being bondable at a predetermined pressure and temperature, said structural member having a melting point higher than said temperature, said structural member containing a fusible material of a melting point at least as low as said temperature, said fusible material electrically and mechanically bonding said conductive paths together.

References Cited in the file of this patent

UNITED STATES PATENTS

| | | |
|---|---|---|
| 1,281,126 | Bevan | Oct. 8, 1918 |
| 2,431,611 | Durst | Nov. 25, 1947 |